United States Patent
Ren et al.

(10) Patent No.: US 10,978,918 B1
(45) Date of Patent: Apr. 13, 2021

(54) WIRELESS POWER DEVICES WITH CAPACITIVE FOREIGN OBJECT DETECTION SENSORS

(71) Applicant: Apple Inc., Cupertino, CA (US)

(72) Inventors: Saining Ren, Auckland (NZ); Patrin Illenberger, Auckland (NZ); Ho Fai Leung, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/782,464

(22) Filed: Feb. 5, 2020

Related U.S. Application Data

(60) Provisional application No. 62/956,522, filed on Jan. 2, 2020.

(51) Int. Cl.
| | |
|---|---|
| *H02J 50/60* | (2016.01) |
| *H02J 50/10* | (2016.01) |
| *G01V 3/08* | (2006.01) |
| *H02J 50/00* | (2016.01) |

(52) U.S. Cl.
CPC .............. *H02J 50/60* (2016.02); *G01V 3/08* (2013.01); *H02J 50/005* (2020.01); *H02J 50/10* (2016.02)

(58) Field of Classification Search
CPC .. H02J 5/005; H02J 7/025; H02J 7/027; H02J 50/005; H02J 50/10; H02J 50/12; H02J 50/60; H02J 50/90
USPC .......................................................... 307/104
See application file for complete search history.

(56) References Cited

U.S. PATENT DOCUMENTS

| | | | |
|---|---|---|---|
| 9,145,110 B2 | 9/2015 | Van Wiemeersch et al. | |
| 9,410,823 B2 | 8/2016 | Widmer et al. | |
| 9,465,064 B2 | 10/2016 | Roy et al. | |
| 9,743,565 B2 | 8/2017 | Van Den Brink et al. | |
| 9,784,878 B2 | 10/2017 | Yamamoto et al. | |
| 9,893,549 B2 | 2/2018 | Bomgräber | |
| 9,952,266 B2 | 4/2018 | Katz et al. | |
| 10,018,744 B2 | 7/2018 | Roy et al. | |
| 10,211,681 B2 | 2/2019 | Roy et al. | |
| 2010/0314947 A1* | 12/2010 | Baarman | H02M 3/1584 307/104 |
| 2014/0049422 A1* | 2/2014 | Von Novak | H02J 50/60 342/146 |

(Continued)

FOREIGN PATENT DOCUMENTS

WO 2017174380 A1 10/2017

*Primary Examiner* — Levi Gannon
(74) *Attorney, Agent, or Firm* — Treyz Law Group, P.C.; G. Victor Treyz; Jason Tsai

(57) ABSTRACT

A wireless power transmitting device uses a wireless power transmitting coil to transmit wireless power signals to a wireless power receiving device. The wireless power transmitting coil is located in a housing. The housing has a circular outline and contains one or more magnets that couple to corresponding magnets in the wireless power receiving device to help align a wireless power receiving coil in the wireless power receiving device to the wireless power transmitting coil in the wireless power transmitting device. A circular array of capacitive sensor electrodes is supported by the housing at a location that overlaps the wireless power transmitting coil. Capacitive sensor measurements from the capacitive sensor array are analyzed to determine whether a foreign object such as a coin or paperclip is present between the housing and the wireless power receiving device.

19 Claims, 5 Drawing Sheets

(56) References Cited

U.S. PATENT DOCUMENTS

| | | | |
|---|---|---|---|
| 2014/0183970 A1* | 7/2014 | Kurihara | H02J 50/10 |
| | | | 307/104 |
| 2015/0323694 A1 | 11/2015 | Roy et al. | |
| 2016/0261137 A1 | 9/2016 | Riehl | |
| 2017/0033609 A1* | 2/2017 | Nakamura | H02J 50/60 |
| 2017/0054333 A1* | 2/2017 | Roehrl | B60L 53/62 |

* cited by examiner

WIRELESS POWER DEVICES WITH CAPACITIVE FOREIGN OBJECT DETECTION SENSORS

This application claims the benefit of provisional patent application No. 62/956,522, filed Jan. 2, 2020, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The wireless power receiving device has a coil and rectifier circuitry. The coil receives alternating-current wireless power signals from the wireless charging mat. The rectifier circuitry converts the received signals into direct-current power.

SUMMARY

A wireless power system has foreign object detection capabilities so that foreign objects such as coins and paper clips are detected. The wireless power system has a wireless power transmitting device and a wireless power receiving device. The wireless power transmitting device uses a wireless power transmitting coil to transmit wireless power signals to the wireless power receiving device. The wireless power transmitting coil and other components of the wireless power transmitting device are located in a housing. The housing has a circular outline and contains one or more magnets that couple to corresponding magnets in the wireless power receiving device to help align a wireless power receiving coil in the wireless power receiving device with the wireless power transmitting coil in the wireless power transmitting device.

Capacitive sensing is used to detect foreign objects. An array of capacitive sensor electrodes is supported by the housing at a location that overlaps the wireless power transmitting coil. Capacitive sensor measurements from the capacitive sensor array are analyzed to determine whether a foreign object such as a coin or paperclip is present between the housing and the wireless power receiving device. If a foreign object is detected, wireless power transmission with the wireless power transmitting coil is halted or other suitable action taken.

DETAILED DESCRIPTION

A wireless power system includes a wireless power transmitting device such as a wireless charging mat or wireless charging puck. The wireless power transmitting device wirelessly transmits power to a wireless power receiving device. The wireless power receiving device may be a device such as a wrist watch, cellular telephone, tablet computer, laptop computer, or other electronic equipment. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

If a foreign object such as a paperclip, coin, or other metallic object is present near the wireless power transmitting coil, there may be a risk of eddy current generation in the foreign object that could elevate the temperature of the foreign object. To determine whether a foreign object such as a paperclip or coin is present in the vicinity of the wireless power transmitting device, the wireless power transmitting device uses a capacitive sensor to make capacitance measurements. In the presence of a metallic object such as a paperclip or coin, the capacitance measurements will deviate from expected values (e.g., capacitance readings will increase/decrease).

Figure 1:
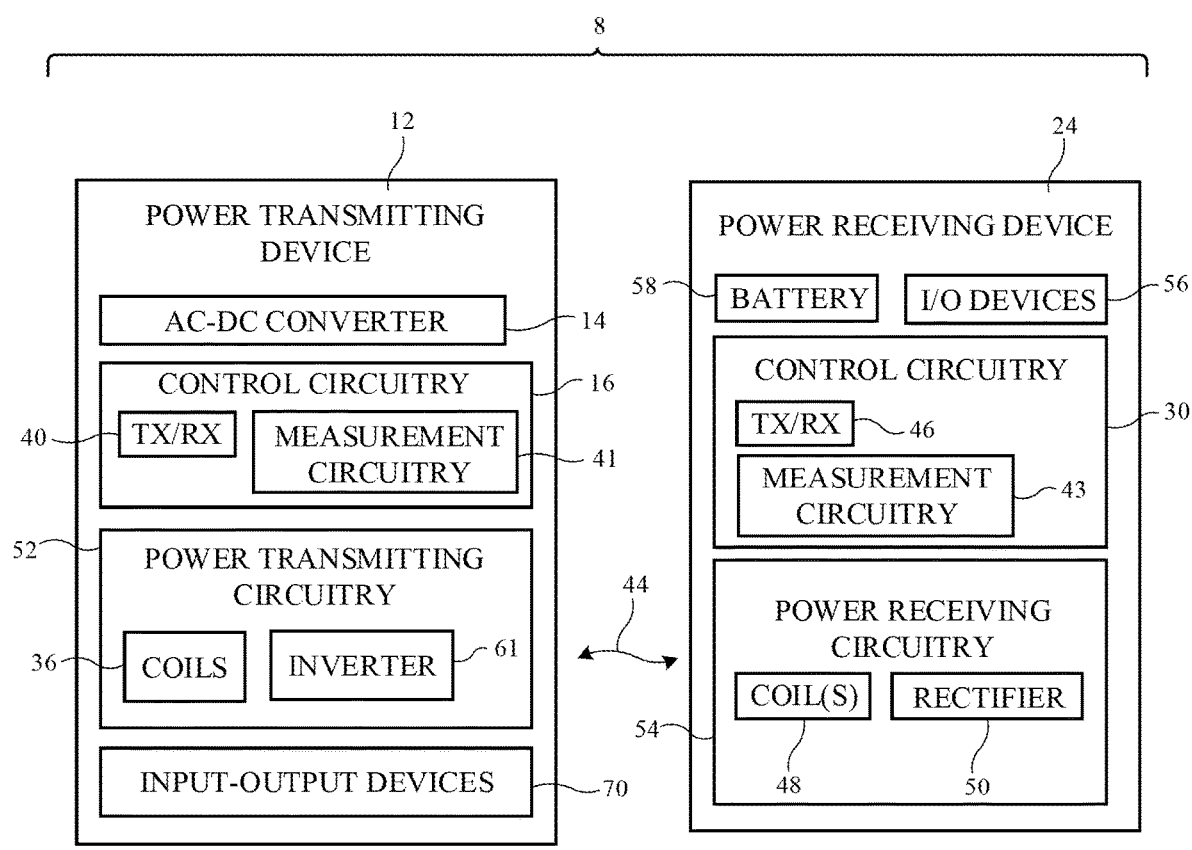
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects and perform other tasks, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or puck that has a wireless power transmission coil and housing with a circular footprint are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. These coil drive signals cause coil(s) 36 to transmit wireless power. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may optionally have one or more input-output devices 70 (e.g., input devices and/or output devices of the type described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, battery states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, metal structures, fabric, and/or other housing wall structures that enclose coil(s) 36 and other circuitry of device 12. The charging surface may be formed by a planer outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets that removably attach device 12 to device 24 (e.g., so that coil 48 aligns with coil 36 during wireless charging).

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). During object detection and characterization operations, external object (foreign object) measurement circuitry 41 can be used to make measurements on coil(s) 36 such as Q-factor measurements, resonant frequency measurements, and/or inductance measurements that can indicate whether coil 48 is present and/or whether foreign objects such as coins or paperclips are present. Measurement circuitry can also be used to make sensor measurements using a capacitive sensor, can be used to make temperature measurements, and/or can otherwise be used in gathering information indicative of whether a foreign object or other external object (e.g., device 24) is present on device 12.

In some configurations, the control circuitry of device 12 (e.g., circuitry 41 and/or other control circuitry 16) can implement a power counting foreign object detection scheme. With this approach, device 12 receives information from device 24 (e.g., via in-band communications) indicating the amount of power that device 24 is wirelessly receiving (e.g., 4.5 W). Device 12 knows how much power (e.g., 5.0 W) is being transmitted (e.g., because device 12 knows the magnitude of the signal being used to drive coil 36 from inverter 61). By comparing the transmitted power (e.g., 5.0 W) to the received power (e.g., 4.5 W), device 12 can determine whether wireless power is being dissipated due to eddy currents flowing in a foreign object. If the dissipated power (e.g., 0.5 W in this example) is more than a predetermined threshold amount or if the efficiency of the wireless power transfer process is lower than expected, device 12 can conclude that a foreign object is present. Power counting techniques such as these may be used in conjunction with capacitive sensing foreign object detection techniques and/or other external object measurement operations performed using circuitry 41.

In some embodiments, measurement circuitry 41 of control circuitry 16 contains signal generator circuitry (e.g., oscillator circuitry for generating AC probe signals at one or more probe frequencies, a pulse generator that can create impulses so that impulse responses can be measured) and/or uses the transmission of wireless power signals from device 12 to energize the coils in system 8. Circuitry 41 may also include circuits (e.g., analog-to-digital converter circuits, filters, analog combiners, digital processing circuitry, etc.) to measure the response of system 8. In an illustrative embodiment, which is sometimes described herein as an example, measurement circuitry 41 includes capacitive sensing circuitry and an array of capacitive sensor electrodes for making capacitive sensor measurements of external objects (e.g., foreign objects).

Figure 2:
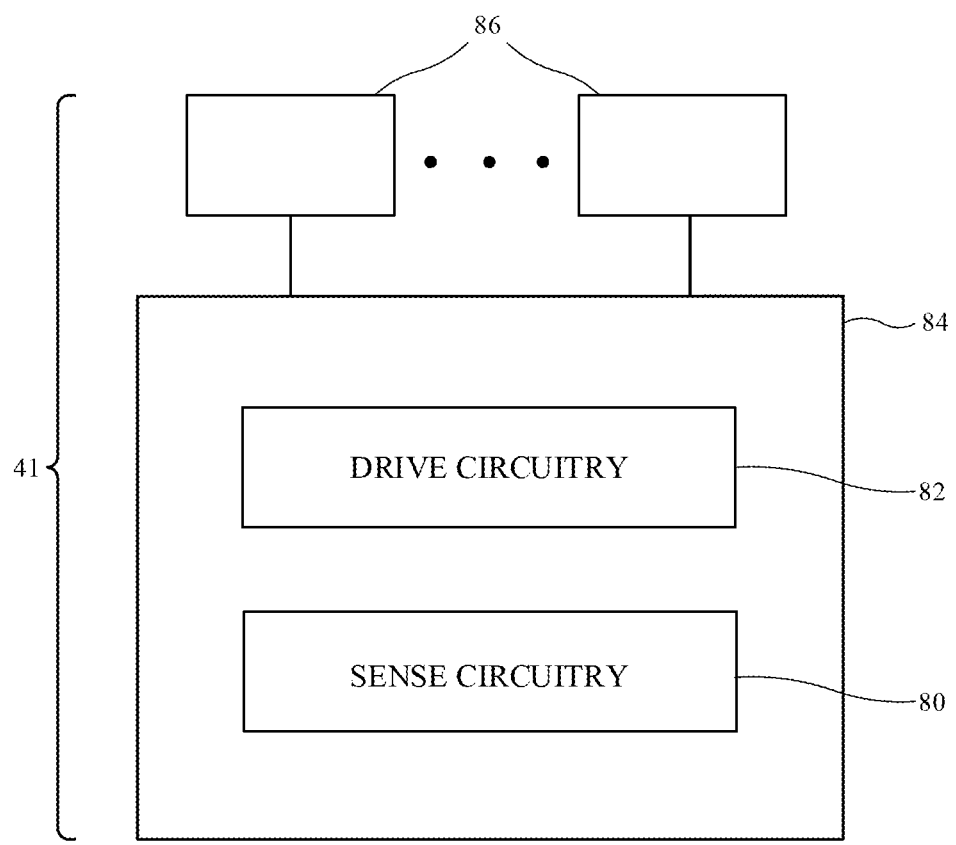
FIG. 2 is a circuit diagram of illustrative capacitive sensing circuitry for a wireless power system in accordance with an embodiment.

An illustrative capacitive sensor for foreign object detection is shown in FIG. 2. As shown in FIG. 2, measurement circuitry 41 includes capacitive sensing circuitry 80 and an array of capacitive sensing electrodes 86. Capacitive sensing circuitry 80 may include drive circuitry 84 for applying a drive signal to one or more of electrodes 86 and sensing circuitry such as sense circuitry 82 for measuring the amount of the drive signal that is received on one, some, or all of the remaining electrodes 86. In an illustrative embodiment, the drive signal is an AC signal with a frequency of at least 10 Hz, at least 100 Hz, at least 1 kHz, at least 10 kHz, at least 100 kHz, less than 100 MHz, less than 10 MHz, less than 1 MHz, less than 500 kHz, less than 100 kHz, 1 kHz to 100 kHz, 10 kHz to 100 kHz, 100 kHz to 500 kHz, etc.

By applying drive signals to each of electrodes 86 in sequence while measuring the resulting signal on the remaining (undriven) electrodes 86, circuitry 80 can be used to measure the capacitance of each electrode 86. Unexpected patterns of capacitances can indicate that a foreign object is present. For example, a foreign object may be detected if the measured capacitances have a pattern in which a particular pair of electrodes 86 exhibits elevated capacitances relative to the rest of electrodes 86. In some situations, the capacitances of all of electrodes 86 are elevated. In this situation, circuitry 41 can compare the measured pattern of the elevated capacitances to a database of acceptable elevated capacitances that are expected in the presence of certain cellular telephones or other valid power receiving devices and thereby discriminate between external objects such as cellular telephones and other valid objects and foreign objects.

Figure 3:
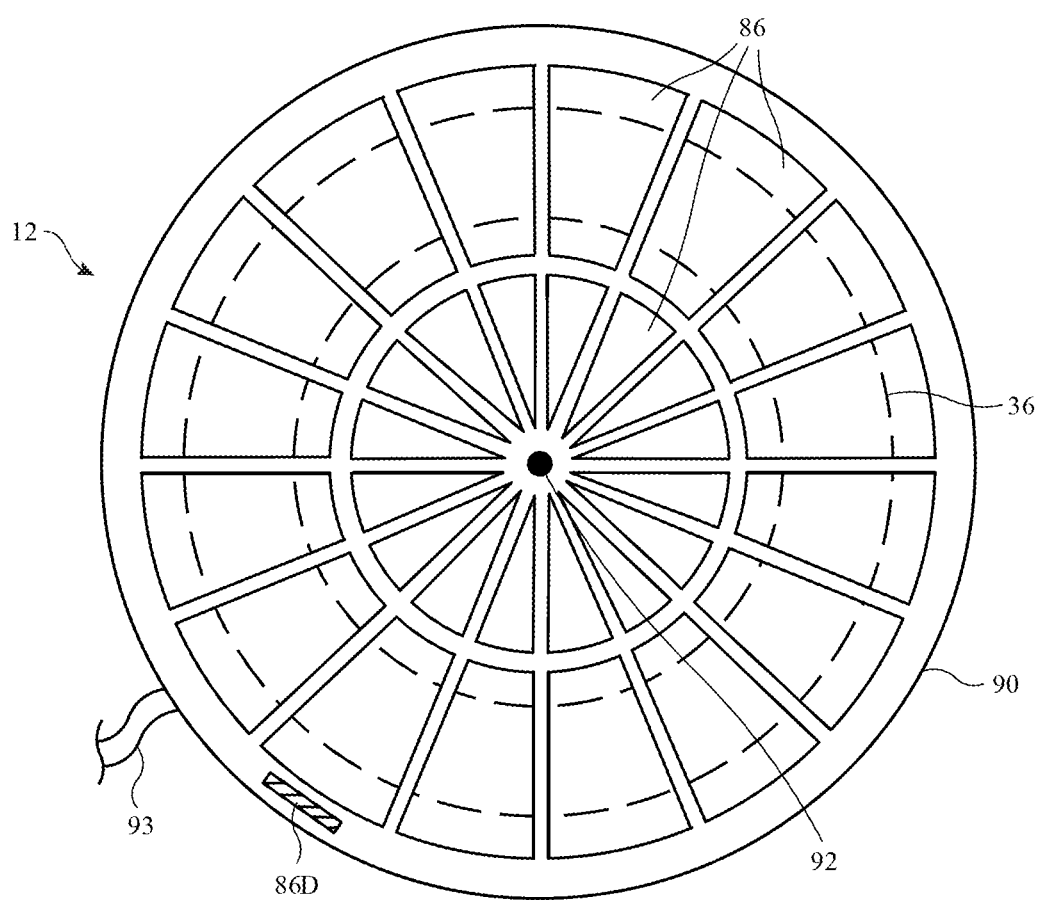
FIG. 3 is a top view of an illustrative wireless power transmitting device with a sensor array in accordance with an embodiment.

Electrodes 86 may all have the same size and shape or different electrodes 86 may have different sizes and/or shapes. In some embodiments, electrodes 86 may arranged in rows and columns (e.g., to form a rectangular array of electrodes 86). In other embodiments, electrodes 86 are arranged in a circular pattern (e.g., to form rings of electrodes exhibiting rotational symmetry about a center point). FIG. 3 is a top view of device 12 in an illustrative configuration in which electrodes 86 are arranged in a circular array (e.g., an array of electrodes having rotational symmetry and a circular outline). Individual electrodes 86 have pie-slice shapes. This is an example. Other layouts for electrodes 86 may be used, if desired.

In the illustrative configuration of FIG. 3, device 12 has a circular housing such as housing 90 (e.g., a housing having a circular outline when viewed from above). Housing 90 may be formed from polymer, ceramic, glass, other dielectrics, fabric, metal, other materials, and/or combinations of such materials. Housing 90 may include housing walls (e.g., upper and lower walls, sidewalls, etc.), may include internal support structures (e.g., frame members, etc.), and/or other structural components. Coil 36 and electrodes 86 may be mounted in housing 90 (e.g., so that that electrode array overlaps coil 36 and detects whether a foreign object is overlapping coil 36). Device 12 may receive power from a cable coupled to housing 90 (e.g., cable 93 of FIG. 3, which may be coupled to a source of DC or AC power) and/or an internal battery in housing 90. In some configurations, device 12 may receive power wirelessly (e.g., to charge an internal battery).

In device 12 of FIG. 3, electrodes 86 are formed from sectors of two rings: an inner ring surrounding center 92 of device 12 and an outer ring that surrounds the inner ring. There may be any suitable number of rings of electrodes 86 (e.g., at least three rings, at least two rings, a single ring, etc.) and each ring may contain any suitable number of conductive sectors forming electrodes 86 (e.g., at least 4, at least 8, at least 16, 10-30, 5-25, 14-40, fewer than 30, etc.). The area of each electrode may be at least 0.05 cm$^2$, at least 0.2 cm$^2$, at least 0.5 cm$^2$, at least 1 cm$^2$, at least 2 cm$^2$, less than 5 cm$^2$, less than 2.5 cm$^2$, less than 1.5 cm$^2$, less than 1 cm$^2$, less than 0.3 cm$^2$, or less than 0.1 cm$^2$ (as examples). In some embodiments, the size of electrodes 86 is selected such that typical foreign objects (e.g., common coins) will necessarily at least partially overlap at least two electrodes. In this way, situations in which a coin lies completely within the outline of a single electrode (which might produce small perturbations to the measured capacitance for that electrode that are challenging to detect) can be avoided.

Electrodes 86 may be formed from conductive material such as metal, semiconductor (e.g., amorphous silicon, etc.), conductive polymer, other conductive materials, alloys and/or multi-layer stacks of such materials (e.g., a metal thin-film layer or other conductive thin-film layer). Electrodes 86 may cover some or all of the charging surface of device 12 and may partly or fully overlap the turns of coil 36.

During wireless power transmission, AC magnetic fields produced by coil 36 may generate small eddy currents in electrodes 86. Eddy currents tend to produce opposing magnetic flux that can reduce wireless power transfer efficiency and undesirably heat electrodes 86. To help suppress eddy currents in electrodes 86 and thereby avoid these effects, the resistance of electrodes 86 may be elevated. For example, electrodes 86 may be formed from a thin film with a thickness that is sufficiently small to help elevate the sheet resistance of electrodes 86 and/or electrodes 86 may be formed from conductive material(s) with relatively high resistivity. As an example, the thickness of electrodes 86 may be 0.05 microns to 2 microns, less than 100 microns, less than 10 microns, less than 1 micron, less than 0.5 microns, at least 0.1 microns, or other suitable thickness. In an illustrative configuration, electrodes 86 may be configured to exhibit a DC sheet resistance of 10 Ω/square-100 kΩ/square, at least 20 Ω/square, at least 200 Ω/square, at least 2 kΩ/square, at least 5 kΩ/square, less than 10 kΩ/square, less than 1000 Ω/square, or less than 300 Ω/square (as examples). The AC resistance of electrodes 86 will be determined by the DC sheet resistance and the geometry of electrodes 86 and the structures forming device 12. Using a material with a sufficiently high DC resistance to form electrodes 86 helps to suppress eddy currents.

Periodically (e.g., during startup and, if desired, at later intervals after wireless power transmission has commenced), capacitive sensor calibration operations may be performed to compensate for capacitance sensor drift (e.g., sensitivity drift due to temperature fluctuations). In an illustrative configuration, device 12 has one or more calibration electrodes such as electrode 86D. During calibration operations, calibrating capacitance measurements are made using electrode 86D (e.g., by driving electrode 86D with a drive signal from drive circuitry 84 while sensing the resulting signal on one or more remaining electrodes 86 using sense circuitry 82, by driving one or more of electrodes 86 while sensing signals with electrode 86D, etc.). Electrode 86D may be located in a portion of housing 12 where electrode 86D is not affected by the presence or absence of objects on the charging surface of device (e.g., under a portion of a sidewall near to the outer periphery of the outer ring of electrodes 86, under electrodes 86, etc.). Data gathered during the calibration measurements may indicate that the sensitivity of electrodes 86 has increased or decreased relative to the nominal sensitivity of electrodes 86 and this measured offset between the expected and actual sensitivity of electrodes 86 can be used by measurement circuitry 41 in calibrating the capacitance sensor so that accurate readings are produced during subsequent capacitance measurements of external objects.

Figure 4:
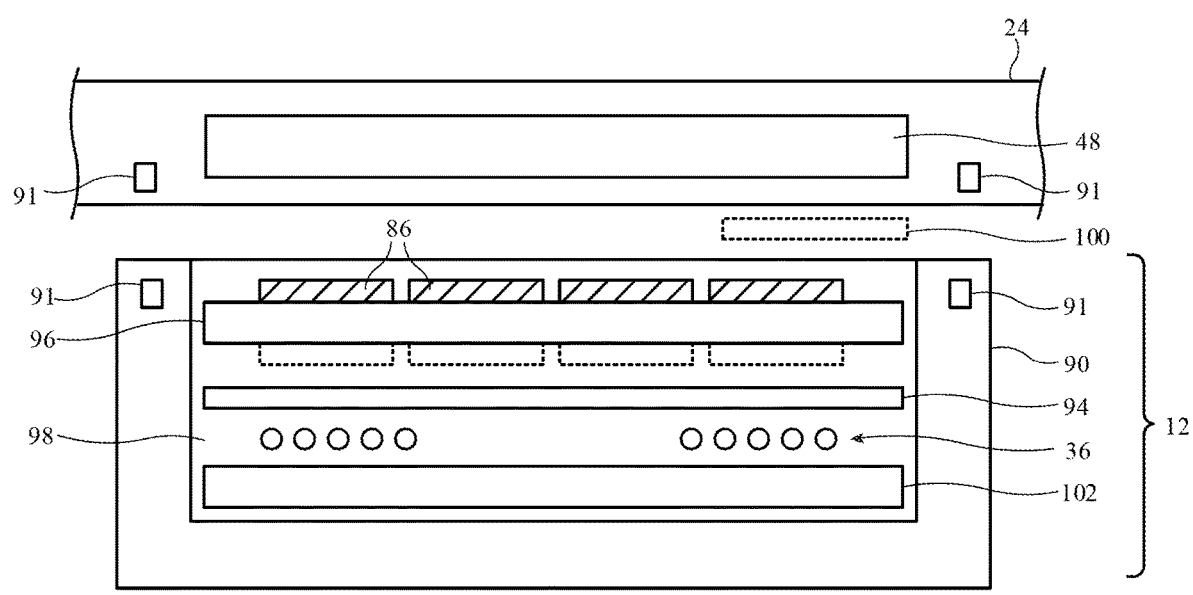
FIG. 4 is a cross-sectional side view of an illustrative wireless power system in accordance with an embodiment.

FIG. 4 is a cross-sectional side view of device 12 and device 24 in system 8 in an illustrative scenario in which a foreign object is present on the charging surface of device 12. As shown in FIG. 4, device 24 may be placed on the surface of device 12 so that wireless power signals transmitted by coil 36 of device 12 are received by coil 48 of device 24. Optional magnetic structures 91 (e.g., permanent magnets and/or members formed form magnetic material such as iron members that are attracted by opposing permanent magnets) can be included in the housing of device 12 and corresponding locations in the housing of device 24 to help removably hold device 24 against the charging surface of device 12 with coil 36 in alignment with coil 48.

In some situations, a foreign object such as a coin, paperclip, or other conductive object may be present on the charging surface, as shown by illustrative foreign object 100 of FIG. 4. As wireless power signals are transmitted by device 12, there is a possibility that the temperature of foreign object 100 will become elevated. Using foreign object detection sensor circuitry such as a capacitive sensor formed from electrodes 86, object 100 can be detected and appropriate action taken (e.g., wireless power transmission can be halted or the maximum wireless power level can be restricted). In some embodiments, a foreign object can be detected before transmission of power with coil 36.

As shown in FIG. 4, electrodes 86 may be mounted on a dielectric substrate such as dielectric layer 96. Layer 96 may be formed from polymer, glass, ceramic, and/or other dielectric materials. Electrodes 86 may be formed on the upper surface of layer 96 and optionally covered with a protective coating layer such as coating 98 (e.g., a polymer layer, inorganic dielectric layer, and/or other covering layer) and/or may be formed on the opposing lower surface of layer 96 (see, e.g., illustrative electrodes 86'). The outer surface of coating 98 of device 12 of FIG. 3 forms a charging surface for device 12 against which wireless power receiving devices such as device 24 may be placed to receive wireless power from coil 36.

Layer 96 and the other structures of device 12 may be mounted in housing 90. Housing 90 may include a rear wall, sidewalls, and a front surface (e.g., layer 96 and the structures on layer 96 such as coating layer 98, which may be considered to form a front or upper housing wall for the housing of device 12). Coil 36 may be separated from electrodes 86 by an optional insulating layer such as layer 94 (e.g., a layer of polymer or other dielectric). Ferrite layer 102 and/or a structure of other magnetic material may be formed under coil 36 to help control the magnetic flux emitted downwardly from coil 36 during wireless power transmission.

Figure 5:
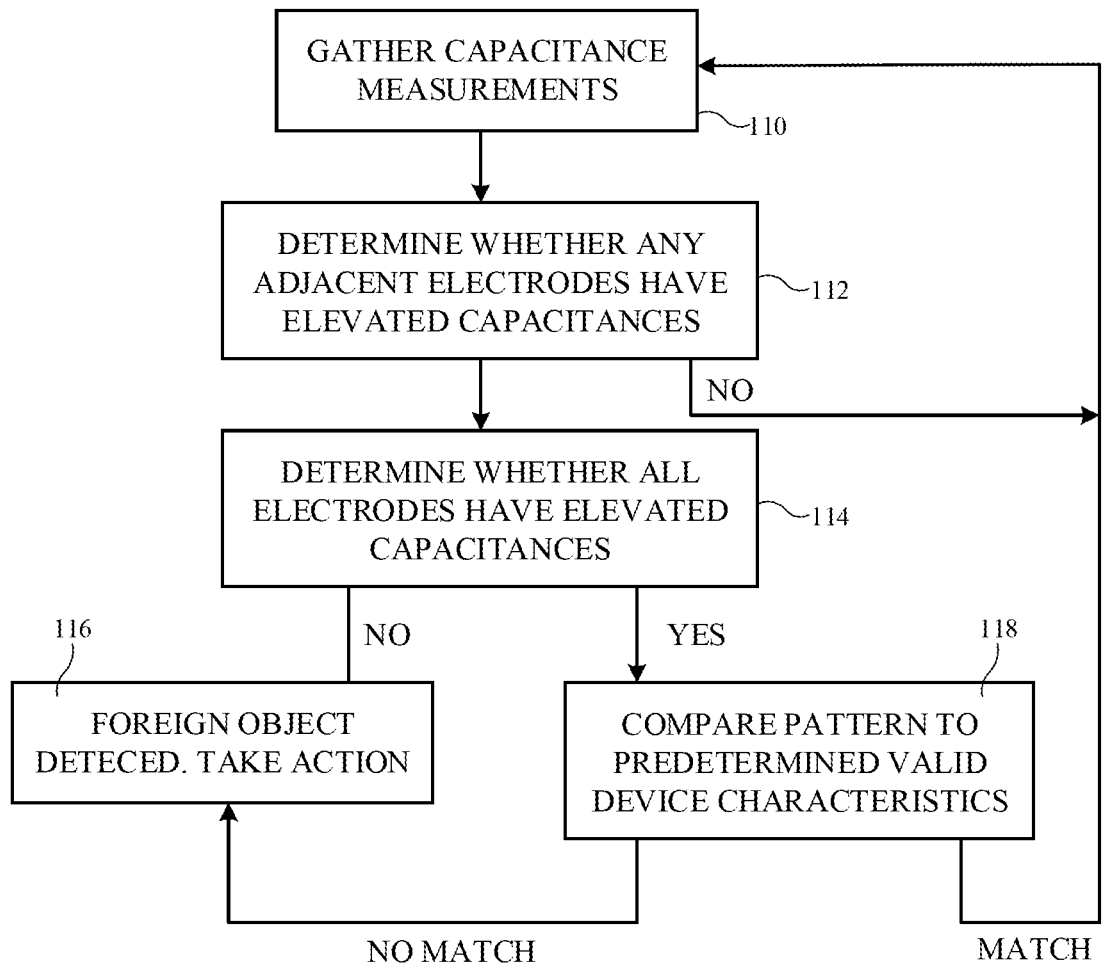
FIG. 5 is a flow chart of illustrative operations involves in operating a wireless power system in accordance with an embodiment.

FIG. 5 is a flow chart of illustrative operations involved in using system 8 to transfer wireless power from device 12 to device 24 while monitoring for the presence of foreign objects. The operations of FIG. 5 involve using capacitive sensor measurements (e.g., measurements with electrodes 86) to detect capacitance variations indicative of a foreign object. If desired, one or more additional foreign object detection techniques may be used in conjunction with these capacitive sensor measurements (e.g., to help confirm that a foreign object is present before taking action or to serve as an independent trigger for foreign object detection). For example, device 12 may have an array of temperature sensors under the charging surface of device 12 to detect elevated temperatures that may be present when eddy currents are induced in a foreign object, device 12 may receive information from device 24 wirelessly that indicates the level of wireless power that is received by device 24 from device 12 (e.g., so that device 12 can compare this level to the known level of transmitted power and thereby use power counting techniques to determine whether sufficient power is being lost during transmission to indicate that a foreign object is present), device 12 may use radio-frequency measurements to detect foreign objects (e.g., measurements of the Q-factor, coil inductance, resonant frequency behavior and/or other characteristics of coil 36 and/or additional foreign object detection coils), device 12 may use optical sensor measurements to detect foreign objects (e.g., proximity sensor measurements), and/or device 12 may use other circuitry for foreign object detection During the operations of block 110, control circuitry 16 of device 12 gathers capacitance measurements from the capacitive sensor in device 12 (e.g., see, e.g., measurement circuitry 41 of FIG. 2, which shows capacitance sensing circuitry using electrodes 86 to gather capacitance measurements). The capacitance measurements of block 110 may be performed upon startup (e.g., when device 12 is powered up and potentially before any power is wirelessly transmitted), and/or may be performed periodically during normal use of device 12 (e.g., to ensure that no foreign objects unexpectedly are placed on the charging surface of device 12 after wireless power transmission operations have begun). During capacitance measurement operations, device 12 may drive signals onto each of electrodes 86 in sequence using drive circuitry 84 while sensing resulting signals on one, some, or all remaining electrodes 86 using sensing circuitry such as circuitry 82. If desired, the total time required to perform a scan of all electrodes 86 may be reduced by driving signals onto more than one of electrodes 86 in parallel. for example, drive circuitry 84 may simultaneously provide drive signals to a pair of electrodes 86 (e.g., non-adjacent electrodes 86 such as electrodes on opposing sides of device 12) while sensing resulting signals on some or all remaining electrodes 86 using sense circuitry 82.

The measurements of block 110 (e.g., the capacitance value measured for each of electrodes 86) are processed by control circuitry 16 to determine whether a foreign object is present. In the illustrative embodiment of FIG. 5, control circuitry 16 compares each of the capacitance measurements from electrodes 86 to baseline values (e.g., default values that have been optionally adjusted based on calibration operations performed using calibration electrodes such as electrode 86D of FIG. 3). As a result of this comparison, control circuitry 16 determines whether any of electrodes 86 exhibit elevated capacitances and whether any adjacent pair of electrodes 86 exhibits elevated capacitances. Capacitances may be considered to be elevated if the measured capacitance for an electrode exceeds the baseline capacitance for that electrode by more than a predetermined threshold amount. If a pair of electrodes 86 are adjacent to each other (whether adjacent electrodes from the inner ring, adjacent electrodes from the outer ring, or adjacent inner and outer ring electrodes), processing continues at block 114. If no pair of adjacent electrodes have elevated values, processing returns to block 110.

During the operations of block 114, control circuitry 16 determines whether all electrode 86 have exhibited elevated capacitance values. If foreign object 100 is present, capacitance changes will be localized in the vicinity of object 100 (e.g., the electrodes that are overlapped by object 100 will have elevated capacitances). Accordingly, all of electrodes 86 will not experience elevated capacitances and device 24 can conclude that a foreign object is present and take appropriate action in response at block 116 (e.g., device 24 can halt wireless power transfer and optionally returns to the operations of block 110 for further monitoring of the capacitive sensor).

If, however, it is determined during the operations of block 114 that all of electrodes 86 exhibit an elevated capacitance, operations may proceed to block 118 to discriminate between a first scenario in which a cellular telephone or other authorized wireless power receiving device is present (e.g., whether the wireless power receiving device with a coil for receiving wireless power is adjacent to the charging surface and is optionally coupled to device 12 using magnets in device 12 and/or device 24 such as magnets 91 of FIG. 4) and a second scenario in which a foreign object such as a coin or paperclip is present (and device 24 is or is not present on top of the foreign object).

When device 24 is present and foreign object 100 is absent, the capacitance changes exhibited by electrodes 86 will have a predefined pattern. As an example, the capacitances of the inner ring will increase by 15% (within a tolerance of 2%, or other suitable tolerance) and the capacitances of the outer ring will increase by 10% (within a tolerance of 2% or other suitable tolerance). This predefined pattern and the predefined patterns associated with other authorized wireless power receiving devices 24 are stored in device 12 (e.g., during manufacturing) and are used by control circuitry 16 during the operations of block 118 to identify when authorized devices are present in the absence of foreign objects. If the elevated capacitances detected during block 114 match the elevated capacitance pattern of an authorized device, processing may return to block 110 (e.g., additional monitoring may be performed). If, however, the elevated capacitances detected during block 114 do not match the elevated capacitance pattern associated with an authorized device, device 12 can conclude that foreign object 100 is present (e.g., in the center of device 12 aligned with center 92 of FIG. 3). Accordingly, device 12 can take appropriate action at block 116 (e.g., wireless power transmission can be halted).

The foregoing is merely illustrative and various modifications can be made to the described embodiments. The foregoing embodiments may be implemented individually or in any combination.

What is claimed is:

1. A wireless power transmitting device for transmitting wireless power to a wireless power receiving device, comprising:
   a housing;
   wireless power transmitting circuitry in the housing, wherein the wireless power transmitting circuitry has a wireless power transmitting coil configured to transmit wireless power signals to the wireless power receiving device through a charging surface;
   a dielectric layer;
   a circular array of capacitive sensor electrodes that overlap the wireless power transmitting coil and that are formed from a thin-film conductive layer on the dielectric layer; and
   control circuitry configured to:
      gather capacitance measurements from each of the capacitive sensor electrodes; and
      determine whether a foreign object is present on the charging surface based on the capacitance measurements.

2. The wireless power transmitting device of claim 1 wherein the capacitive sensor electrodes each have a thickness of less than 10 microns.

3. The wireless power transmitting device of claim 1 wherein the capacitive sensor electrodes each have a direct-current sheet resistance of 10 Ω/square-100 kΩ/square.

4. The wireless power transmitting device of claim 1 wherein the capacitive sensor electrodes comprise an outer ring of capacitive sensor electrodes surrounding an inner ring of capacitive sensor electrodes.

5. The wireless power transmitting device of claim 1 wherein the control circuitry is configured to determine whether the foreign object is present at least partly by determining whether any two of the capacitive sensor electrodes exhibit changed capacitance values relative to baseline capacitance values.

6. The wireless power transmitting device of claim 1 wherein the wireless power transmitting device is configured to determine whether the foreign object is present at least partly by determining whether capacitance measurements from the array of capacitive sensor electrodes correspond to a wireless power receiving device at the charging surface.

7. The wireless power transmitting device of claim 1 wherein the control circuitry is configured to halt wireless power transmission with the wireless power transmitting circuitry in response to determining that the foreign object is present.

8. The wireless power transmitting device of claim 1 further comprising a calibration electrode, wherein the control circuitry is configured to calibrate the capacitive sensor electrodes by making capacitance measurements with at least one of the capacitive sensor electrodes and the calibration electrode.

9. The wireless power transmitting device of claim 1 wherein the housing has a circular outline and comprises at least one magnet configured to attract a corresponding magnet in the wireless power receiving device.

10. The wireless power transmitting device of claim 1 wherein the control circuitry comprises drive circuitry and sense circuitry and wherein the control circuitry is configured to gather the capacitance measurements by driving a signal onto each of the capacitive sensor electrodes in sequence with the drive circuitry while using the sense circuitry to measure corresponding signals on remaining electrodes in the capacitive sensor electrodes.

11. The wireless power transmitting device of claim 1 wherein the control circuitry comprises drive circuitry and sense circuitry and wherein the control circuitry is configured to gather the capacitance measurements by driving a signal onto successive pairs of the capacitive sensor electrodes with the drive circuitry while using the sense circuitry to measure corresponding signals on remaining electrodes in the capacitive sensor electrodes.

12. A wireless power transmitting device for transmitting wireless power to a wireless power receiving device, comprising:
   a wireless power transmitting coil configured to transmit wireless power signals to the wireless power receiving device;
   a first ring of capacitive sensor electrodes;
   a second ring of capacitive sensor electrodes surrounding the first ring of capacitive sensor electrodes; and
   control circuitry configured to:
      gather capacitance measurements from the first and second rings of capacitive sensor electrodes; and
      determine whether a foreign object is present on the charging surface based on the capacitance measurements.

13. The wireless power transmitting device of claim 12, wherein the first and second rings of capacitive sensor electrodes overlap the wireless power transmitting coil, wherein the control circuitry comprises drive circuitry and sense circuitry, and wherein the control circuitry is configured to gather the capacitance measurements by driving a signal onto successive pairs of non-adjacent capacitive sensor electrodes in the first and second rings of capacitive sensor electrodes while using the sense circuitry to measure corresponding signals on remaining capacitive sensor electrodes in the first and second rings of capacitive sensor electrodes.

14. The wireless power transmitting device of claim 12 wherein the control circuitry comprises drive circuitry and sense circuitry and wherein the control circuitry is configured to gather the capacitance measurements by driving a signal onto each of the capacitive sensor electrodes in sequence with the drive circuitry while using the sense circuitry to measure corresponding signals on remaining electrodes in the capacitive sensor electrodes.

15. The wireless power transmitting device of claim 12 wherein the control circuitry comprises drive circuitry and sense circuitry and wherein the control circuitry is configured to gather the capacitance measurements by driving alternating-current signals onto at least one of the capacitive sensor electrodes with the drive circuitry while gathering signals from at least one other one of the capacitive sensor electrodes with the sense circuitry and wherein the alternating-current signals have a frequency of 100 Hz to 10 MHz.

16. The wireless power transmitting device of claim 15 wherein the alternating-current signals have a frequency of 100 kHz to 500 kHz.

17. The wireless power transmitting device of claim 12 wherein the capacitive sensor electrodes are formed from a conductive material having a sheet resistance of at least 10 Ω/square.

18. A wireless power transmitting device configured to transmit wireless power to a wireless power receiving device having a coil, comprising:
- a wireless power transmitting coil configured to transmit wireless power signals to the wireless power receiving device;
- a dielectric layer;
- a circular array of capacitive sensor electrodes formed from a thin-film conductive layer on the dielectric layer; and
- control circuitry configured to:
  - determine whether a foreign object is present on the charging surface based on capacitance measurements from the circular array of capacitive sensor electrodes; and
  - in response to determining that a foreign object is present, halt transmission of the wireless power signals.

19. The wireless power transmitting device of claim 18 further comprising a housing containing the wireless power transmitting coil and a magnet in the housing that is configured to attract a corresponding magnetic structure in the wireless power receiving device during transmission of the wireless power signals.

* * * * *